United States Patent
Van Phan et al.

(10) Patent No.: US 9,473,907 B2
(45) Date of Patent: Oct. 18, 2016

(54) OPERATING BROADBAND PUBLIC SAFETY MOBILE COMMUNICATION

(75) Inventors: Vinh Van Phan, Oulu (FI); Ling Yu, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/369,230

(22) PCT Filed: Dec. 29, 2011

(86) PCT No.: PCT/FI2011/051163
§ 371 (c)(1),
(2), (4) Date: Jun. 27, 2014

(87) PCT Pub. No.: WO2013/098461
PCT Pub. Date: Jul. 4, 2013

(65) Prior Publication Data
US 2014/0329517 A1 Nov. 6, 2014

(51) Int. Cl.
| | | |
|---|---|---|
| *H04W 4/08* | (2009.01) | |
| *H04W 64/00* | (2009.01) | |
| *H04W 76/02* | (2009.01) | |
| *H04W 4/02* | (2009.01) | |
| *H04W 4/22* | (2009.01) | |
| *H04W 88/06* | (2009.01) | |
| *H04L 29/08* | (2006.01) | |
| *H04W 84/20* | (2009.01) | |

(52) U.S. Cl.
CPC ............ *H04W 4/08* (2013.01); *H04L 67/1051* (2013.01); *H04W 4/021* (2013.01); *H04W 4/22* (2013.01); *H04W 64/00* (2013.01); *H04W 76/023* (2013.01); *H04W 88/06* (2013.01); *H04W 84/20* (2013.01)

(58) Field of Classification Search
CPC ... H04W 76/023; H04W 84/20; H04W 4/08; H04W 64/00; H04W 88/06; H04W 48/18; H04W 4/22

USPC .................. 455/418, 419, 432.1, 453, 552.1; 370/329, 336
See application file for complete search history.

(56) References Cited

U.S. PATENT DOCUMENTS

| | | | |
|---|---|---|---|
| 2007/0211866 A1 | 9/2007 | Sink | 379/37 |
| 2009/0116430 A1 | 5/2009 | Bonta et al. | 370/329 |
| 2010/0046363 A1 | 2/2010 | Shenoy et al. | 370/216 |

FOREIGN PATENT DOCUMENTS

| | | |
|---|---|---|
| WO | WO 2008/110202 A1 | 9/2008 |
| WO | WO 2010/049801 A1 | 5/2010 |

OTHER PUBLICATIONS

S1-113010; Alcatel-Lucent, et al.; "FS_ProSe: Public Safety Use Cases"; 3GPP TSG-SA WG1 Meeting #56; San Francisco, CA, USA Nov. 14-18, 2011.
David Taylor, "How will LTE deliver for public safety"; Apr. 26, 2011; http://www.analysysmason.com/About-Us/News/Newsletter/How-will-LTE-deliver-for-public-safety/?journey=1391.

*Primary Examiner* — Sam Bhattacharya
(74) *Attorney, Agent, or Firm* — Harrington & Smith (57) ABSTRACT

A method includes providing a broadband public safety network PSN that includes at least a first MS1 and a second MS2 mobile device and a first coverage area; and providing a broadband mobile communication network CN including a second coverage area 104. The method includes detecting the MS1 and MS2 mobile devices are residing out of the first coverage area and residing in the second coverage area 104. Then the MS1 and MS2 mobile devices are starting to operate in a Device to Device mode 204. The method further includes defining a group including the MS1 and MS2 mobile devices that are communicating in the Device to Device mode. The method includes determining, by using a selection mechanism including one or several timers, which of the MS1 and MS2 mobile devices acts as a controlling mobile device for the group 202.

20 Claims, 6 Drawing Sheets

OPERATING BROADBAND PUBLIC SAFETY MOBILE COMMUNICATION

FIELD OF THE INVENTION

The present invention relates to broadband mobile telecommunication systems. In particular, the present invention relates to a novel and improved method and system for operating broadband public safety mobile communication, said method comprising: providing a broadband public safety network comprising at least a first and a second mobile device and a first coverage area; providing a broadband mobile communication network comprising a second coverage area; detecting that said first and second mobile devices are residing out of said first coverage area and residing in said second coverage area; and said first and second mobile devices starting to operate in a Device to Device mode.

BACKGROUND

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two devices occurs over a wireless link. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. They can also be called mobile communication systems or mobile communication networks.

A mobile telecommunication network typically operates in accordance with a wireless standard. Examples include GSM (Global System for Mobile) EDGE (Enhanced Data for GSM Evolution) Radio Access Networks (GERAN), Universal Terrestrial Radio Access Networks (UTRAN), and evolved Universal Terrestrial Radio Access Networks (EUTRAN).

A further example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. The aim of LTE is to achieve, inter alia, reduced latency, higher user data rates, improved system capacity and coverage, and reduced cost for the operator. A further development of the LTE is often referred to as LTE-Advanced.

In system according to the LTE standard a base station access node is called enhanced or evolved Node B.

A user can access the communication system by means of an appropriate communication device. A communication device of a user is often referred to as user equipment (UE) or terminal or mobile device or a mobile station. A communication device is provided with an appropriate signal receiving and transmitting arrangement for enabling communications with other parties. The device may also comprise user interface for communicating with the user and a controller for controlling the operation of the device.

A communication device may be arranged to communicate, for example, data for carrying communications such as voice, electronic mail (email), text message, multimedia, for enabling internet access, for carrying application specific data and so on. Users may thus be offered and provided numerous services via their communication devices. The communication connection can be provided by means of one or more data bearers.

In wireless systems a communication device provides a transceiver device that can communicate with another communication device such as e.g. an access node or a base station and/or another user equipment. The communication device may access a carrier provided by a base station and transmit and/or receive communications on the carrier.

A feature of wireless communication devices is that they offer mobility for the users thereof. A mobile communication device, or mobile device or mobile station for short, may also be transferred, or handed over, from a base station to another and even between base stations belonging to different systems.

A communication device or user equipment that has no continuous connection to its home system may nevertheless be considered as being a part of a communication system. In certain applications, for example in ad-hoc networks or in PSN i.e. public safety networks, the communication system may be based on use of a plurality of user equipment capable of communicating with each other. In this kind of situation the devices do not necessarily have a continuous connection to the own (PSN) network.

PSN networks are separate mobile communication networks that are used by law enforcement, rescue services, fire brigades and other public authorities or even public utilities for time and mission critical communication. In PSN networks the mobile devices may communicate directly with each other in Device to Device mode or in so called direct mode. The operation of PSN network must be fast, reliable and secure, regardless of lack of network coverage, lack of resources or any type of network failure. The PSN Network must have high availability, with no single point of failure, a highly resilient architecture and guaranteed availability even in times of a major incident, when the network will be stressed. It must also continue to operate through power outages.

The above requirements are difficult to fulfill, particularly with scarce resources. Also, sometimes on certain areas of the PSN network, resources are used only sporadically and therefore the usage intensity on that area is low. Therefore, it is sometimes not possible to build costly PSN networks to all areas, e.g. to all very sparsely populated or very remote areas, where the usage intensity is low.

This invention considers the problem how an available commercial cellular network may provide assistance in ensuring robustness of PSN mission critical operations and services in e.g. the following situations: 1) a base station site of PSN went off—out of service—e.g. as being destroyed in accident or disaster; 2) unexpected PSN failure that blocks the use of whole PSN; 3) a major incident happens in an area without PSN coverage—therefore network services are needed on this out of PSN coverage area; 4) an extremely large incident happens in an area of PSN—this leads to congestion of whole PSN—some other means of communication is needed for the devices thus being isolated from the PSN.

In particular this invention is related to a situation where at least two communication devices belonging to a PSN network lose their connections to their own PSN network but would still need the resources and connectivity of the PSN networks. Those communication devices would like to communicate to the PSN network, to other networks and devices in them or alternatively with each other. The problem that appears in this situation is how to effectively establish network connection and connectivity to these at least two communication devices without any undue delay. It is also possible that the at least two communication devices may attempt to simultaneously act as the device that controls the communication. This would consume more resources and delay the establishment of connections between the devices and other parts or services of the PSN network.

SUMMARY

A target of the invention is to develop a method, a system and a mobile device so that the abovementioned drawbacks of the prior art are circumvented. One of the targets of the invention is to create a mechanism for PSN mobile devices for how they can recover a total or partial coverage outage of PSN.

An another target of the invention is to develop a method, a system and a mobile device that can solve a situation in which more than one mobile devices are substantially simultaneously starting to act as a controlling mobile devices i.e. as a cluster head of a cluster i.e. as a head of a group of mobile devices. In this case the mobile stations are out of the coverage of a PSN network to which the devices originally belong to.

The target of the invention is achieved by a method, a system and a mobile device that is characterised by those features that are depicted in the independent patent claims.

According to an aspect of the present invention, there is provided a method as specified in claim 1.

According to another aspect of the present invention, there is provided a mobile communication system as specified in claim 14.

According to another aspect of the present invention, there is provided a mobile device as specified in claim 18.

Some other embodiments of the invention are defined in the dependent claims.

This invention shows mechanisms for establishing alternative connections to recover coverage outage of PSN utilizing commercial cellular network.

The invention is solving a situation in which one or several mobile devices belonging to a Public Safety Network i.e. to PSN network are residing out of the coverage area of the PSN network but within coverage area of e.g. commercial mobile communications network. This invention is based on an inventive idea that these mobile devices start competing among themselves to decide which one of these devices will establish connection to the home PSN via the commercial mobile communications networks on which coverage area the devices are residing. The competition between the devices is established by using a selection mechanism that decides which of the devices will act as a controlling mobile device or as a cluster head. The selection mechanism is based on various timers. The timers may measure the lapsing of several time limits.

The invention enhances robustness and self-sufficiency Public Safety Networks PSN to cope with site failure or out-of-coverage situations using assistance from available commercial mobile communications networks.

BRIEF DESCRIPTION OF DRAWINGS

Embodiments of the present invention are described below, by way of example only, with reference to the accompanying drawings, which are included to provide a further understanding of the invention and constitute a part of this specification. The drawings illustrate exemplary embodiments of the invention and together with the description help to explain the principles of the invention. In the drawings.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features/structures that have not been specifically mentioned.

Reference will now be made in detail to the embodiments of the present invention, examples of which are illustrated in the accompanying drawings.

Figure 1:
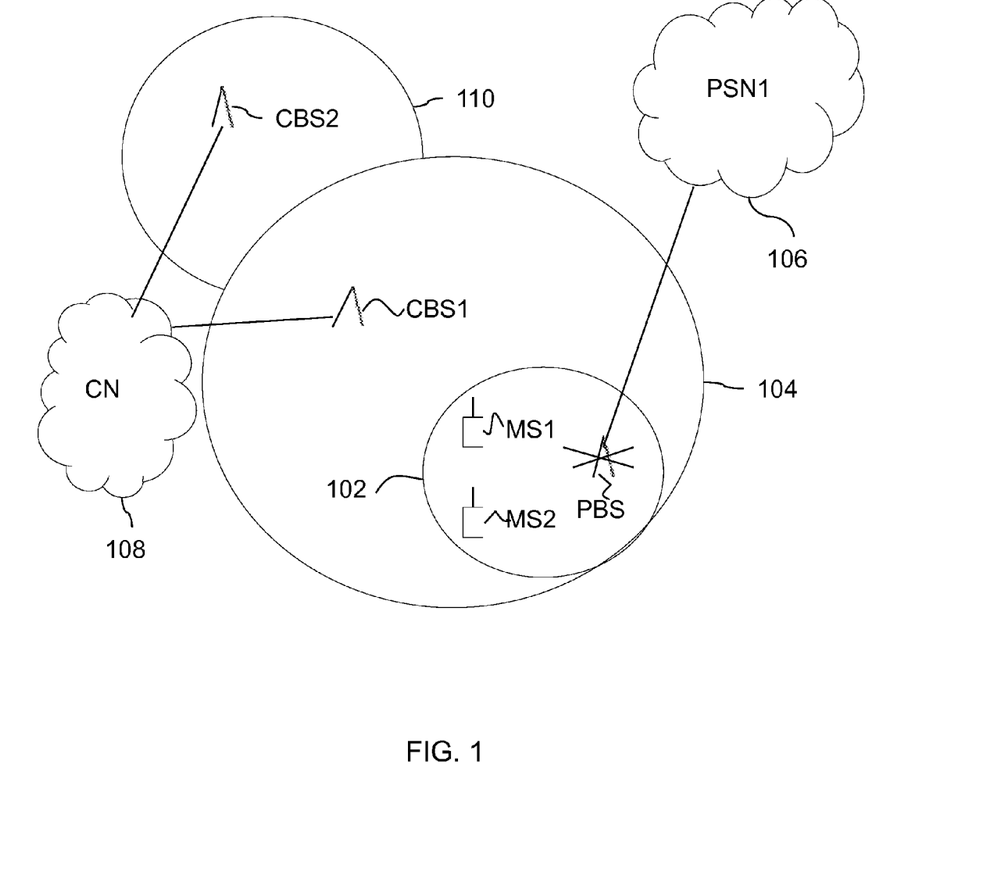
FIG. 1 shows a schematic view of a general exemplary situation in which the invention is realised.

FIG. 1 shows a schematic view of a general exemplary situation in which the invention is realised. The broadband mobile communication system shown here in FIG. 1 is a combination of at least two mobile communication networks namely the public safety network PSN 106 and a broadband mobile communication network CN 108. The broadband mobile communication system comprises at least a first MS1 and a second MS2 mobile device adapted to operate in a broadband public safety network PSN 106 having a base station PBS or eNodeB. So, these mobile devices MS1 and MS2 belong originally to the public safety network PSN 106 and are designed to operate in the PSN network. The base station or eNodeB network element maintains with its radio unit a first coverage area 102 in which the mobile devices MS1 and MS2 are able to contact the broadband public safety network PSN 106 and via it also other networks and network elements. The public safety network PSN 106 is a separate mobile communication network that only emergency services, police and rescue services e.g. fire department may use and connect to. It may also be designated only for the users belonging to law enforcement organizations. This PSN network should be more reliable than normal public broadband mobile communication system 108 and mainly separated from any other, particularly commercial, networks so as to avoid any disruptions or malfunctions or other severe and bad network conditions to spread from any commercial network to the PSN network.

In FIG. 1 it is also shown broadband mobile communication comprising a broadband mobile communication network CN 108 which may be e.g. a $3^{rd}$ generation or $4^{th}$ generation broadband mobile communication network according to, for example, a LTE i.e. Long Term Evolution standard. The broadband mobile communication network CN 108 comprises a second coverage area 104 maintained by a base station CBS1 or eNodeB network element according to the LTE standard.

In the inventive broadband mobile communication system first MS1 and second MS2 mobile devices are residing out of first coverage area 102. This may be due to the fact that the base station PBS is not operating at all, or PSN network is congested or out of service or that the network element maintaining the coverage area can't create any connections to the Public Safety Network. This is shown with a X mark on the base station PBS symbol in FIG. 1. Nevertheless, the broadband mobile communication network CN is adapted to detect that said first MS1 and second MS2 mobile devices are residing in said second coverage area 104. This is because these mobile devices attempt to take contact to the existing network, in this case to the broadband mobile communication network CN 108.

Figure 2:
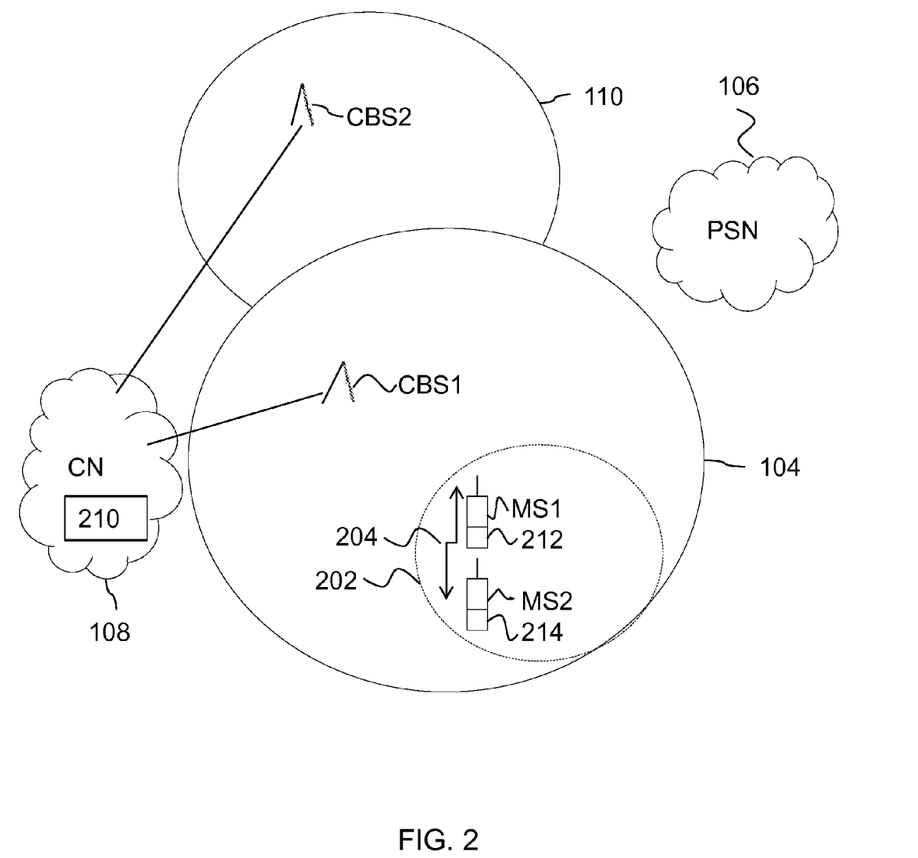
FIG. 2 shows a schematic view of an exemplary situation in which the invention is realised when the devices are not located in the coverage area of the Public Safety Network.

FIG. 2 shows a schematic view of an exemplary situation in which the invention is realised when the devices are not located in the coverage area of the Public Safety Network PSN. In the inventive broadband mobile communication system these first MS1 and second MS2 mobile devices are adapted to establish a group 202 of mobile devices operating in a Device to Device 204 mode or D2D communication. Group comprises two or more mobile devices that are communicating directly with each. In previous public safety network PSN standards the call established between the mobile devices of a group was called a group call. The mode of operation was previously called direct mode of operation, emphasising that the communication between the mobile devices belonging to same group was direct and it does not necessarily need any other network elements. If the communication is only between machines without any human input then this kind of direct communication may also be called mobile to mobile communication or M2M communication.

In FIG. 2 it is shown a schematic block diagram of broadband mobile communication system according to the invention. This inventive system comprises: at least a first MS1 and a second MS2 mobile device adapted to operate in a broadband public safety network PSN having a first coverage area 102. In this FIG. 2 the first mobile device MS1 and the second mobile device MS2 respectively both comprise a selection mechanism 212; 214 for deciding which of said first MS1 and second mobile MS2 devices will start acting as a controlling mobile device of said group 202. This selection mechanism may also be located in the broadband mobile communication network CN as indicated with reference number 210. According to this invention the broadband mobile communication network CN comprises a second coverage area 104 that is created by a communication radio CBS1 that may be a base station of the mobile communications network or it may be other network element providing radio bearer services. The operation of this selection mechanism is further clarified in connection with the subsequent figures.

In the inventive broadband mobile communication system of FIG. 2 the first MS1 and second MS2 mobile devices are residing out of the first coverage area 102 in the second coverage area 104 and the broadband mobile communication network CN is adapted to detect that the first MS1 and second MS2 mobile devices are residing in the second coverage area 104. The broadband mobile communication network CN will notice that the first MS1 and second MS2 mobile devices are located in its coverage area only when the first MS1 and the second MS2 devices select, access and register to the broadband mobile communication network CN.

The inventive method also comprises the step of defining a spectrum allocation for the first MS1 and the second MS2 mobile device for events when the mobile devices MS1, MS2 are residing out of the first coverage area 102 but are residing in the second coverage area 104. The spectrum allocation may be generated in any of the network elements or in any of the mobile devices.

Figure 3:
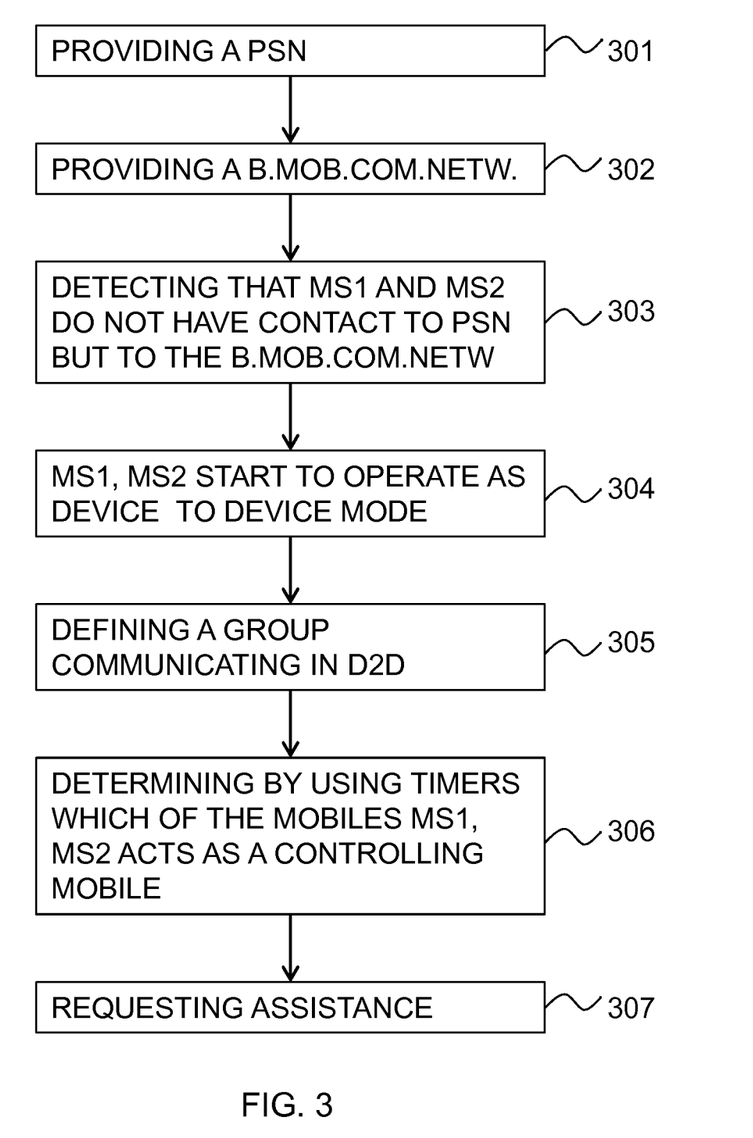
FIG. 3 is a flow diagram illustrating the functioning of a method according to one embodiment of the invention.

FIG. 3 is a flow diagram illustrating the functioning of a method according to one embodiment of the invention. This FIG. 3 illustrates a method for operating broadband public safety mobile communication. In the method a broadband public safety network PSN comprising at least a first MS1 and a second MS2 mobile device and a first coverage area 102 is provided 301. Then a broadband mobile communication network CN comprising a second coverage area 104 is provided. The more detailed structure of these networks is illustrated in connection with FIGS. 1 and 2.

In the inventive method it is detected 303 that the first MS1 and second MS2 mobile devices are residing out of said first coverage area 102 and residing in said second coverage area 104. This detection may be accomplished by the broadband mobile communication network CN.

In the method illustrated in FIG. 3, after the detection 303 the first MS1 and the second MS2 mobile devices do start 304 to operate in a Device to Device mode 204. The Device to Device mode is previously described more accurately in connection with FIG. 2.

In the inventive method after the devices MS1 and MS2 start 304 to operate in Device to Device mode 204, it is defined 305 a group comprising the first device MS1 and the second device MS2 that are communicating in said Device to Device mode. A group may comprise two or more devices that may communicate with each other directly.

In the inventive method the following step is the determining 306, by using a selection mechanism comprising one or several timers (FIG. 8) 816, 818, 820, which of the first MS1 and second MS2 mobile devices acts as a controlling mobile device for the group 202. The timers are further described in connection with FIG. 8.

In one of the embodiments of the invention the method comprises also requesting 307 of assistance from the broadband mobile communication network CN for the group 202. This feature of the inventive method is one of the alternatives that are realized. The meaning of this feature is that in certain cases a network element or a device will ask help from the broadband mobile communication network CN for the communication of the group 202 of mobile devices MS1 and MS2. It is also clear that also other requests of help may be sent. These can be requests from the Public Safety Network PSN to the broadband mobile communication network CN or from individual mobile devices MS1 and MS2 to either the broadband mobile communication network CN or to the Public Safety Network PSN via the broadband mobile communication network CN. It is also clear that in each of these alternative cases the request may vary in its form, formation and originator. The request may ask for resources for individual mobile device MS1, MS2 or to a whole group 202 of mobile devices. These resources may be communication resources between group member devices, communication resources between one group member device and another network element located in other parts of the broadband mobile communication network. The resource may be related to the Public Safety network PSN or the nature of its operation. The mobile device sending the request resources may or may not be a controlling mobile device MS1 of the group 202. The controlling mobile device MS1 is the device that controls the operation of the devices in one group 202.

In FIG. 3 the step of determining 306 is accomplished by a method that is selected from the following group of methods: pre-configuration and self-configuration.

The method of pre-configuration comprises defining that the controlling mobile MS1 is acting as a controlling mobile irrespective of any timer 810, 812, 814 values 816, 818, 820. These timers and the respective values are further described in the following figures.

Figure 4:
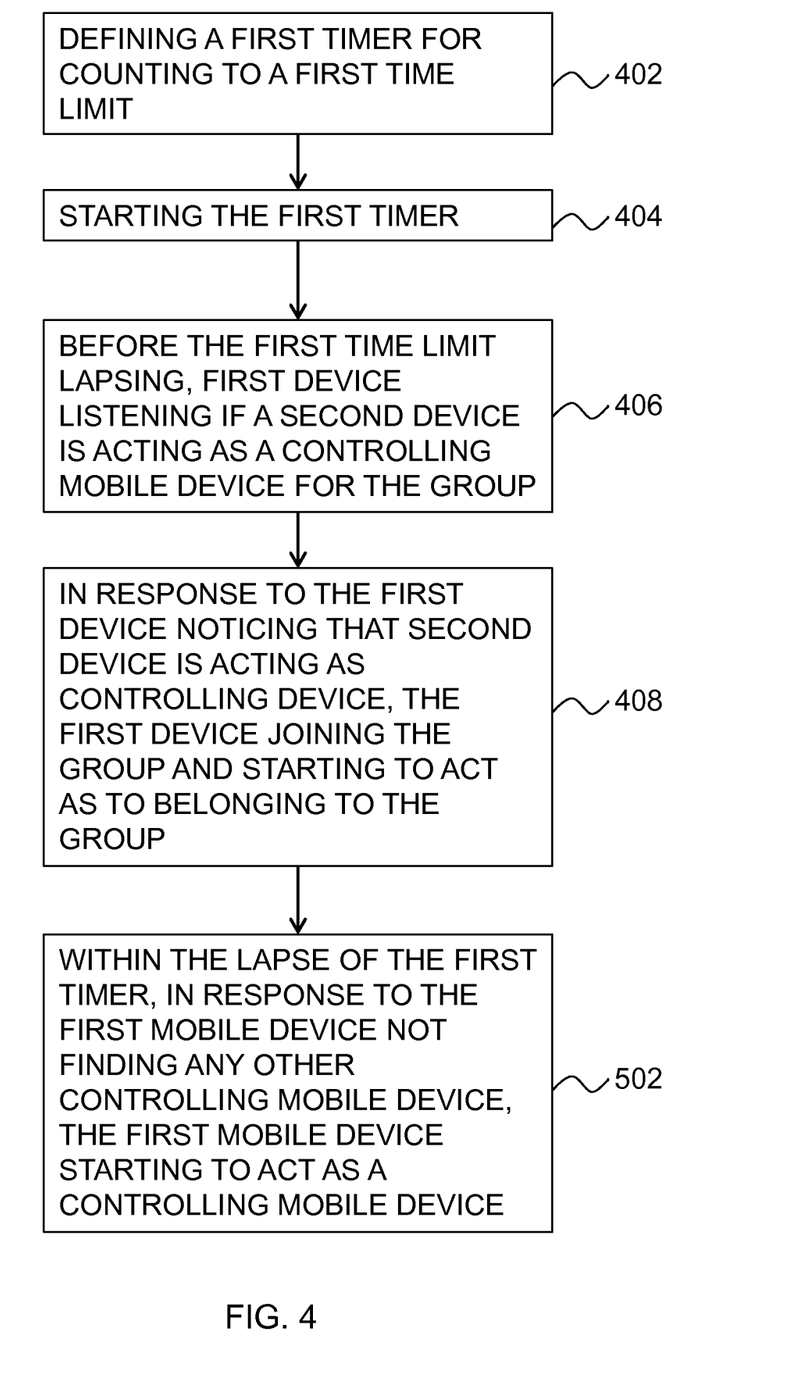
FIG. 4 is a flow diagram illustrating the functioning of a method according to one embodiment of the invention.

FIG. 4 is a flow diagram illustrating the functioning of a method according to one embodiment of the invention. In FIG. 4 the operation of self-configuration is further described. FIG. 4 shows a more detailed illustration of the method step determining 306 that is shown in FIG. 3. The timers discussed in FIG. 4 are described more accurately and structurally in FIG. 6. In this method the inventive self-configuration comprises the following steps: defining 402 a first timer 810, see FIG. 6, for counting to a first time limit 816, and starting the first timer 810. Then before the first time limit 816 is lapsing, the first mobile is listening 406 if a second mobile device MS2 is acting as a controlling mobile device for the group 202. See FIG. 2 for the members of the group. In the method, in response to the first mobile device MS1 noticing that a second mobile device MS2 is acting as a controlling mobile device for the group 202, the first mobile device MS1 is joining 408 the group 202 and starting to act as a mobile device belonging to the group 202.

In the method, within the lapse of the first timer 810, if the first mobile device MS1 is not finding any other mobile device that is acting as a controlling mobile device, then the first mobile device MS1 is starting 502 to act as a controlling mobile device. This may require that the first mobile device is configuring itself to operate as a controlling mobile device.

Figure 5:
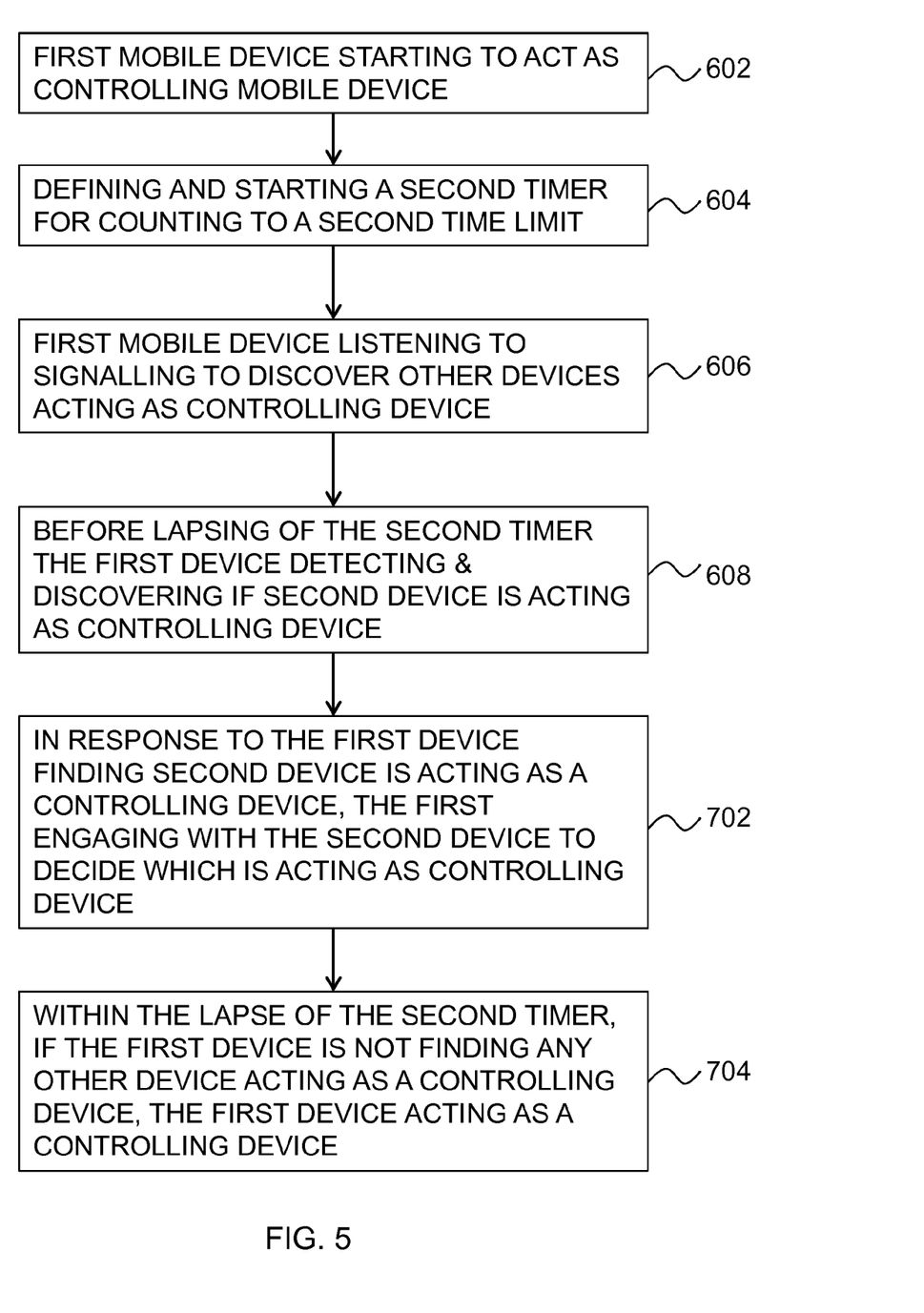
FIG. 5 shows a flowchart of an alternative embodiment of the self-configuration method.

FIG. 5 shows a flowchart of an alternative embodiment of the self-configuration method. The method described here comprises the following steps: Firstly the first mobile device MS1 is starting 602 to act as a controlling mobile device. Then it is defined 604 a second timer 812 for counting to a second time limit 818, both shown in FIG. 6, and that second timer 812 is started. Then the first mobile device MS1 is listening 606 to signalling to discover if other mobile devices are acting as a controlling mobile device. Then, before lapsing of the second timer 812, the first mobile device MS1 is detecting 608 and discovering if a second mobile device MS2 is acting as a controlling mobile device. In response to the first mobile device MS1 finding that the second mobile device MS2 is acting as a controlling mobile device, the first mobile device MS1 is engaging 702 with the second mobile device MS2, to decide which of the first MS1 and second MS2 devices will be acting as a controlling mobile device and joining each other in the group 202. If, within the lapse of the second timer 812, in response to the first mobile device MS1 is not finding any other mobile device that is acting as a controlling mobile device, then the first mobile device MS1 starts acting 704 as a controlling mobile device.

In this invention it is defined that the group 202 of mobile devices is a cluster and that the controlling mobile device is a Cluster Head. Cluster head is a device that manages the interaction between the group members and other network elements located in the broadband mobile communication network CN. For example the Cluster head or the controlling mobile device is creating connection to the broadband mobile communication network CN and thorough it to the broadband public safety network PSN. Also the controlling mobile device i.e. the cluster head may be reporting about connections and traffic in its group 202 to the broadband public safety network PSN. Those devices acting as a cluster head may access the available commercial cellular network to report to the broadband public safety network PSN location-specific status including detected out-of-coverage events to its OAM controller for instance. This may be embedded into or happen along with the reselection of the broadband mobile communication network CN that is e.g. a commercial cellular network on which coverage area the devices are located or where the devices are camping on or connected to when they are not in the coverage area of the broadband public safety network PSN.

In the invention the broadband public safety network PSN may be requesting assistance from the available commercial broadband cellular network CN. In one option, the broadband public safety network PSN upon detecting the aforementioned out-of-coverage situation, based on received PSN location-specific status reports or other means, may contact commercial cellular network(s) operating over the coverage area in question for checking availability and requesting assistance. In one instance, the broadband public safety network PSN may ask the selected commercial cellular network CN to set up and operate a full broadband public safety network PSN dedicated carrier over the specified area temporarily. In another instance, the broadband public safety network PSN may ask the selected commercial cellular network CN to provide only limited radio access functions and services on the PSN dedicated carrier such as some Down Link (DL) synchronization channels and reference signals and common control signalling to assist Device to Device i.e. D2D communication at the site. In a further instance, the broadband public safety network PSN may ask the selected commercial cellular network to provide connectivity between authenticated cluster heads or to serve requests related to radio access on the broadband public safety network PSN dedicated carrier directly from certain authenticated and authorized cluster heads.

In the co-operation between the cluster heads and the broadband public safety network PSN, the network informs the cluster heads about the expectable assistance, as specified above, of the selected commercial cellular network through the commercial cellular access network the cluster head is camping in or connected to. If the selected commercial cellular network is not the same as the one that cluster head is camping in or connected to, the cluster head will be redirected to the selected commercial cellular network.

In an another option, the authorized cluster heads may request the network element eNB of the selected commercial cellular network CN to provide certain radio signalling services as well as radio bearer services on the broadband public safety network PSN dedicated carrier. For instance, cluster head i.e the device controlling the group may ask the serving eNB of the selected commercial cellular network CN to provide some radio access functions and services on the broadband public safety network PSN dedicated carrier such as sending some down link (DL) synchronization channels and reference signals, common control signalling and certain radio bearer (RB) service (especially for multicasting group call) to assist device to device (D2D) communications at the site.

Figure 6:
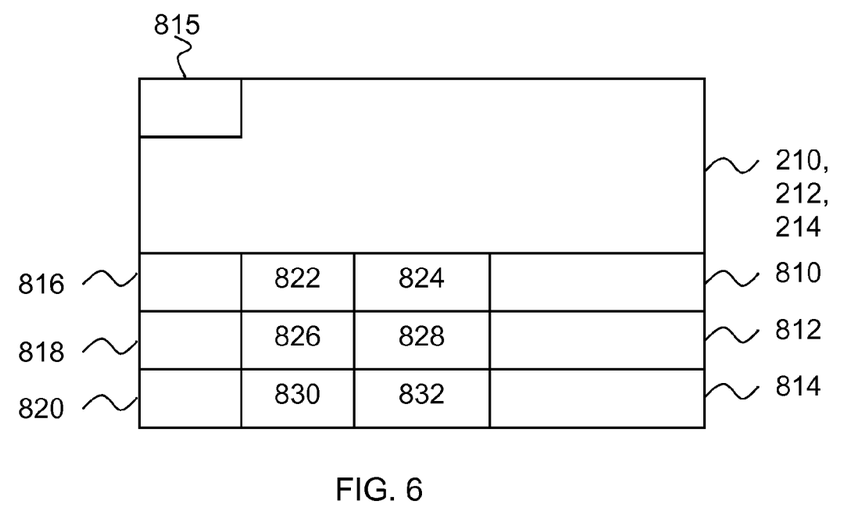
FIG. 6 shows a block diagram of the selection mechanism of this inventive method and system.

FIG. 6 shows a block diagram of the selection mechanism of this inventive method and system. According to the invention the selection mechanism (see also FIG. 2 references 210, 212, 214) is determining (see also FIG. 3 reference 306), which of the first MS1 and second MS2 mobile devices acts as a controlling mobile device for the group 202 by using a selection mechanism comprising one or several timers (FIG. 6) 816, 818, 820. The selection mechanism may be located in any of the mobile devices MS1 or MS2 as references 212 and 214 indicate in FIG. 2. Also, as shown with reference 210 in FIG. 2, the selection mechanism may be located in the cellular network CN in any of its network elements.

The operation of the timers 810, 812, 814 is clarified below in connection with FIGS. 2 and 6. When mobile device MS1, normally belonging to public safety network PSN is out of the PSN cellular access coverage starts timer 810 and the mobile device MS1 switches to device to device D2D mode of operation. The device to device D2D mode has a predefined spectrum allocated for it. The device MS1 then first tries to find some other active D2D device MS2 acting as a cluster head i.e. capable of providing control and necessary gateway functionality for local device to device group 202 to connect with other mobiles in the group or with the network. Then if the mobile device MS1 does not find any active cluster head nearby within first time limit 816 then upon time-out of this time limit this first device MS1 may configure itself to operate as a device to device D2D cluster head. To this point there may be many devices operating as stand-alone cluster heads, as many devices may switch to device to device D2D mode at the same time and fail to discover each other within the first time limit 816. Then a second timer 812 with a second time limit 818 is designated for these stand-alone cluster heads i.e. controlling devices to discover one another and other populated clusters so as to join each other in a new cluster i.e. in a new group or in an existing populated cluster and therefore reduce the number of stand-alone cluster heads. The second timer 816 may start after the first timer 810 has reached the first time limit value 816 and an time-out has occurred. Individual devices acting as cluster heads i.e. as controlling devices after the second timer 812 timeout may select to camp on or connect to an available commercial cellular network for their clusters. According to this invention the time limit of the first 810 and second timer 812 may be configured as semi-static or random, both generated within configured minimum 822; 826 and maximum 824; 828 values.

The selection mechanism shown in FIG. 6 may also comprise requesting means 815 for requesting assistance from the broadband mobile communication network CN for the group i.e. for the cluster. The selection mechanism shown in FIG. 6 and in FIG. 2 as referenced with 210, 212, 214 is either pre-configuration or self-configuration mechanism.

Figure 7:
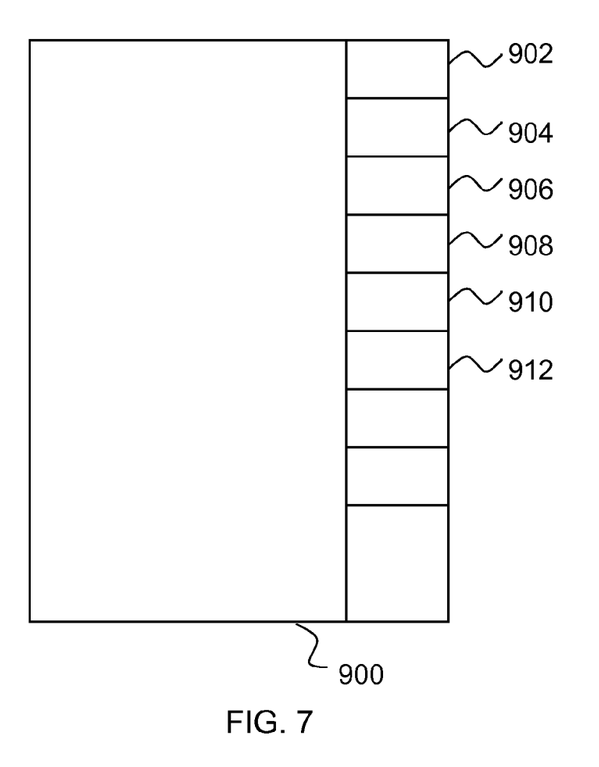
FIG. 7 shows a block diagram of an inventive mobile device 900 being adapted for operation in a broadband public safety network PSN.

FIG. 7 shows a block diagram of an inventive mobile device 900 being adapted for operation in a broadband public safety network PSN. The mobile device comprises a radio 902 for communicating in (see also FIG. 2) a group 202 of mobile devices MS1, MS2 communicating in Device to Device mode 204 in a coverage area 104 of a broadband mobile communication network CN. The radio 902 may be realized by using different means known to a person working in this field. The mobile device 900 comprises also a controller 904 for controlling the operation of said radio 902. The mobile device may also comprise a user interface 906 for exchanging information between the mobile device 900 and a user. However if the mobile device is operating in machine to machine M2M mode then the user interface may not be present.

The inventive mobile device 900 comprises a selection mechanism 908 for determining which mobile device (see also FIG. 2) MS1, MS2 in the group 202 starts acting as a controlling mobile device in the group 202. The group may be called cluster.

The inventive mobile device 900 may also comprise a requesting unit 910 for requesting assistance from the broadband mobile communication network CN or from the broadband public safety network PSN.

The inventive mobile device 900 may also comprise one or several timers 912 (see also FIG. 6 references 810, 812 and 814) for counting to one or several time limits (FIG. 6 references 816, 818, 820) for controlling the mobile device 900 to act as a controlling mobile device or as a cluster head of the group 202 that may also be called a cluster.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method comprising:
   in response to detecting that a first and a second mobile device are residing out of a coverage area of a broadband public safety network providing cellular access coverage to said first and second mobile devices and are residing in a coverage area of a commercial broadband communication network:
   controlling said first and second mobile devices to begin to operate in a Device to Device mode;
   defining a group comprising said first and second mobile devices that are communicating in said Device to Device mode; and
   determining, by using a selection mechanism employing one or more timers, which of said first and second mobile devices is to act as a controlling mobile device for said group.

2. The method according to claim 1, further comprising one of:
   controlling said controlling mobile device to request assistance from said broadband mobile communication network for said group; and
   controlling said controlling mobile device to request said broadband mobile communication network to provide assistance for said group communicating in said Device to Device mode.

3. The method according to claim 1, further comprising requesting, by said broadband public safety network, said broadband mobile communication network to provide assistance for said group communicating in Device to Device mode.

4. The method according to claim 1, further comprising:
   defining a first timer for counting to a first time limit, and starting said first timer;

before the expiration of said first time limit, controlling said first mobile device to listen for an indication that a second mobile device is acting as a controlling mobile device for said group;

controlling said first mobile device to, in response to detection by said first mobile device that a second mobile device is acting as a controlling mobile device for said group, join said group and begin to act as a mobile device belonging to said group; and controlling said first mobile device to, in response to failing, during the pendency of said first timer, to discover any other mobile device acting as a controlling mobile device, begin to act as a controlling mobile device.

5. The method according to claim 4, wherein said time limit of said first and second timer may be configured as semi-static or random, with said time limit being set within configured minimum and maximum values.

6. The method according to claim 1, further comprising:
controlling said first mobile device to begin to act as a controlling mobile device, define a second timer for counting to a second time limit, and start said second timer;
controlling said first mobile device to listen to signalling to discover other mobile devices that are acting as a controlling mobile device;
controlling said first mobile device to, in response to discovering that said second mobile device is acting as a controlling mobile device, negotiate with said second mobile device to establish which of said first and second devices will be acting as a controlling mobile device and joining each other in said group; and
controlling the first mobile device to, in response to failing to find any other mobile device acting as a controlling mobile device, act as a controlling mobile device.

7. The method according to claim 1, wherein said group of mobile devices is a cluster and said controlling mobile device is a Cluster Head.

8. The method according to claim 1, further comprising, by said controlling mobile device, creating a connection to said broadband mobile communication network.

9. The method according to claim 1, further comprising, by said controlling mobile device, creating a connection to said broadband public safety network via said broadband mobile communication network.

10. The method according to claim 1, wherein said controlling mobile device reports about connections and traffic in its group to said broadband public safety network.

11. The apparatus of claim 1, wherein the apparatus is further caused to:
control said first mobile device to begin to act as a controlling mobile device, define a second timer for counting to a second time limit, and start said second timer;
control said first mobile device to listen to signalling to discover other mobile devices that are acting as a controlling mobile device;
control said first mobile device to, in response to discovering that said second mobile device is acting as a controlling mobile device, negotiate with said second mobile device to establish which of said first and second devices will be acting as a controlling mobile device and joining each other in said group; and
control the first mobile device to, in response to failing to find any other mobile device acting as a controlling mobile device, act as a controlling mobile device.

12. The apparatus according to claim 11, wherein said time limit of said first and second timer may be configured as semi-static or random, with said time limit being set within configured minimum and maximum values.

13. A broadband mobile communication system, comprising:
at least a first and a second mobile device configured to operate in a broadband public safety network providing cellular access coverage to the first and second mobile devices; and
a commercial broadband mobile communication network;
wherein said commercial broadband mobile communication network is configured, when said first and second mobile devices are residing out of a coverage area of the broadband public safety network, to detect that said first and second mobile devices are residing in a coverage area of the commercial broadband mobile communication network;
wherein said first and second mobile devices, in response to said detection, begin to operate in a device to device mode;
wherein said first and second mobile device are adapted to define a group comprising said first and second mobile devices communicating in said Device to Device mode; and
wherein said broadband mobile communication system comprising a selection mechanism for deciding which of said first and second mobile devices will start acting as a controlling mobile device of said group.

14. A mobile device comprising:
at least one processor; and
at least one memory including compuer program code;
the memory and the computer program code configured to, with the at least one processor, cause the mobile device at least to perform:
in response to detecting that the mobile device and a second mobile device are residing out of a coverage area of a broadband public safety network providing cellular access coverage to the mobile device and the second mobile device are residing in a coverage area of a commercial broadband communication network:
begin to operate in a Device to Device mode with the second mobile device:
defining a group comprising the mobile device and the second mobile device that are communicating in said Device to Device mode; and
determining, by using a selection mechanism employing one or more timers, which of said mobile device and second mobile device is to act as a controlling mobile device for said group.

15. The mobile device according to claim 14, wherein the mobile device further requests assistance from said commercial broadband mobile communication network.

16. The mobile device according to claim 14, wherein mobile device acts as a controlling mobile device of said group based on the occurrence or nonoccurrence of one or more conditions during the pendency of one or more timers.

17. An apparatus comprising:
at least one processor;
memory including computer program code;
the memory and the computer program code configured to, with the at least one processor, cause the apparatus at least to perform:
in response to detecting that a first and a second mobile device are residing out of a coverage area of a broadband public safety network providing cellular access coverage to said first and second mobile devices and are residing in a coverage area of a commercial broadband communication network:
controlling said first and second mobile devices to begin to operate in a Device to Device mode;
defining a group comprising said first and second mobile devices that are communicating in said Device to Device mode; and
determining, by using a selection mechanism employing one or more timers, which of said first and second mobile devices is to act as a controlling mobile device for said group.

18. The apparatus according to claim 17, wherein the apparatus is further caused to perform one of:
controlling said controlling mobile device to request assistance from said broadband mobile communication network for said group; and
controlling said controlling mobile device to request said broadband mobile communication network to provide assistance for said group communicating in said Device to Device mode.

19. The apparatus according to claim 17, wherein the apparatus is further caused to control said controlling mobile device to request said broadband mobile communication network to provide assistance for said group communicating in Device to Device mode.

20. The apparatus according to claim 17, wherein the apparatus is further caused to:
define a first timer for counting to a first time limit, and start said first timer;
before the expiration of said first time limit, control said first mobile device to listen for an indication that a second mobile device is acting as a controlling mobile device for said group;
control said first mobile device to, in response to detection by said first mobile device that a second mobile device is acting as a controlling mobile device for said group, join said group and begin to act as a mobile device belonging to said group; and
control said first mobile device to, in response to failing, during the pendency of said first timer, to discover any other mobile device acting as a controlling mobile device, begin to act as a controlling mobile device.

* * * * *